(12) United States Patent
Jung et al.

(10) Patent No.: US 10,747,981 B2
(45) Date of Patent: Aug. 18, 2020

(54) DISPLAY FOR RECOGNIZING FINGERPRINT AND ELECTRONIC DEVICE

(71) Applicant: SAMSUNG ELECTRONICS CO., LTD., Suwon-si, Gyeonggi-do (KR)

(72) Inventors: Dae-Kwang Jung, Yongin-si (KR); Jung-Sik Park, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 91 days.

(21) Appl. No.: 16/048,575

(22) Filed: Jul. 30, 2018

(65) Prior Publication Data
US 2019/0034690 A1  Jan. 31, 2019

(30) Foreign Application Priority Data
Jul. 31, 2017 (KR) .................. 10-2017-0097094

(51) Int. Cl.
- *G06K 9/00* (2006.01)
- *G02B 5/30* (2006.01)
- *G02B 1/11* (2015.01)

(52) U.S. Cl.
CPC ....... *G06K 9/00046* (2013.01); *G02B 5/3025* (2013.01); *G02B 5/3083* (2013.01); *G06K 9/0004* (2013.01); *G06K 9/0008* (2013.01); *G02B 1/11* (2013.01)

(58) Field of Classification Search
CPC combination set(s) only.
See application file for complete search history.

(56) References Cited

U.S. PATENT DOCUMENTS

| | | | |
|---|---|---|---|
| 5,416,573 A | 5/1995 | Sartor, Jr. | |
| 5,737,071 A | 4/1998 | Arndt | |
| 6,300,929 B1 | 10/2001 | Hisatake et al. | |
| 2008/0062140 A1 | 3/2008 | Hotelling et al. | |
| 2012/0306771 A1 | 12/2012 | Chen et al. | |
| 2013/0307818 A1 | 11/2013 | Pope et al. | |
| 2016/0283773 A1* | 9/2016 | Popovich | G02B 26/0808 |

FOREIGN PATENT DOCUMENTS

| | | |
|---|---|---|
| KR | 10-2015-0131944 | 11/2015 |
| WO | 2015/015138 | 2/2015 |

OTHER PUBLICATIONS

Extended Search Report dated Dec. 19, 2018 in counterpart European Patent Application No. 18186237.6.

* cited by examiner

Primary Examiner — Christopher Wait
(74) Attorney, Agent, or Firm — Nixon & Vanderhye P.C.

(57) ABSTRACT

According to an embodiment of the present disclosure, a display may comprise a transparent cover, a light source comprising light emitting circuitry configured to emit first light in a first direction, a first polarizer disposed between the light source and the cover and configured to linearly polarize the first light, and a first retarder disposed between the first polarizer and the cover and configured to change a polarization of the first light from a linear polarization to a non-linear polarization.

20 Claims, 9 Drawing Sheets

DISPLAY FOR RECOGNIZING FINGERPRINT AND ELECTRONIC DEVICE

CROSS-REFERENCE TO RELATED APPLICATION

This application is based on and claims priority under 35 U.S.C. § 119 to Korean Patent Application No. 10-2017-0097094, filed on Jul. 31, 2017, in the Korean Intellectual Property Office, the disclosure of which is incorporated by reference herein in its entirety.

BACKGROUND

Field

The disclosure relates to fingerprint recognition methods and electronic devices for the same.

Description of Related Art

More and more services and additional functions are being provided through smartphones or other portable electronic devices. To meet the needs of various users and raise use efficiency of electronic devices, communication service carriers or device manufacturers are jumping into competitions to develop electronic devices with differentiated and diversified functionalities.

As electronic devices come up with better capability, various biometric recognition techniques are being applied to electronic devices. Fingerprint recognition is most widely used among those biometric recognition technologies. Fingerprint perception-based user authentication boasts of its superior security and simplified way.

The above information is presented as background information only to assist with an understanding of the disclosure. No determination has been made, and no assertion is made, as to whether any of the above might be applicable as prior art with regard to the disclosure.

SUMMARY

In fingerprint recognition using an optical fingerprint sensor, if the user's finger is dry or cold, the cover of the fingerprint sensor may be left apart from the user's fingerprint in which case the sensor may not properly distinguish between the ridges and valleys of the fingerprint, and this fails to present an exact result.

According to an embodiment, a display may comprise a transparent cover, a light source comprising light emitting circuitry configured to emit first light in a first direction, a first polarizer disposed between the light source and the cover and configured to linearly polarize the first light, and a first retarder disposed between the first polarizer and the cover and configured to change a polarization of the first light from a linear polarization to a non-linear polarization.

According to an embodiment, the first retarder may be a retarder capable of changing the polarization of the first light from linear polarization to non-linear polarization, from non-linear polarization to linear polarization, or maintaining non-polarization.

According to an embodiment, an electronic device may comprise a transparent cover, a light source comprising light emitting circuitry configured to emit first light in a first direction, a first polarizer disposed between the light source and the cover and configured to linearly polarize the first light, a first retarder disposed between the first polarizer and the cover and configured to change a polarization of the first light from a linear polarization to a non-linear polarization; and an image sensor configured to detect third light transmitted through the light source and forming a fingerprint image.

According to an embodiment, the first retarder may be a retarder capable of changing the polarization of the first light from linear polarization to non-linear polarization, from non-linear polarization to linear polarization, or maintaining non-polarization.

According to an embodiment, an electronic device may comprise a housing, a transparent member comprising at least a portion of an outer surface of the electronic device and disposed in at least a portion of the housing, a display panel at least partially received in the housing, a retardation layer disposed between the transparent member and the display panel and configured to phase-retard light incident through the transparent member to the display panel by substantially 90 degrees, and an image sensor disposed in or under at least a portion of the display panel and configured to receive at least a portion of the light incident through at least a portion of the display panel and the retardation layer.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features and attendant advantages of the present disclosure will be more apparent from the following detailed description, taken in conjunction with the accompanying drawings, wherein.

Throughout the drawings, like reference numerals will be understood to refer to like parts, components, and structures.

DETAILED DESCRIPTION

Figure 1:
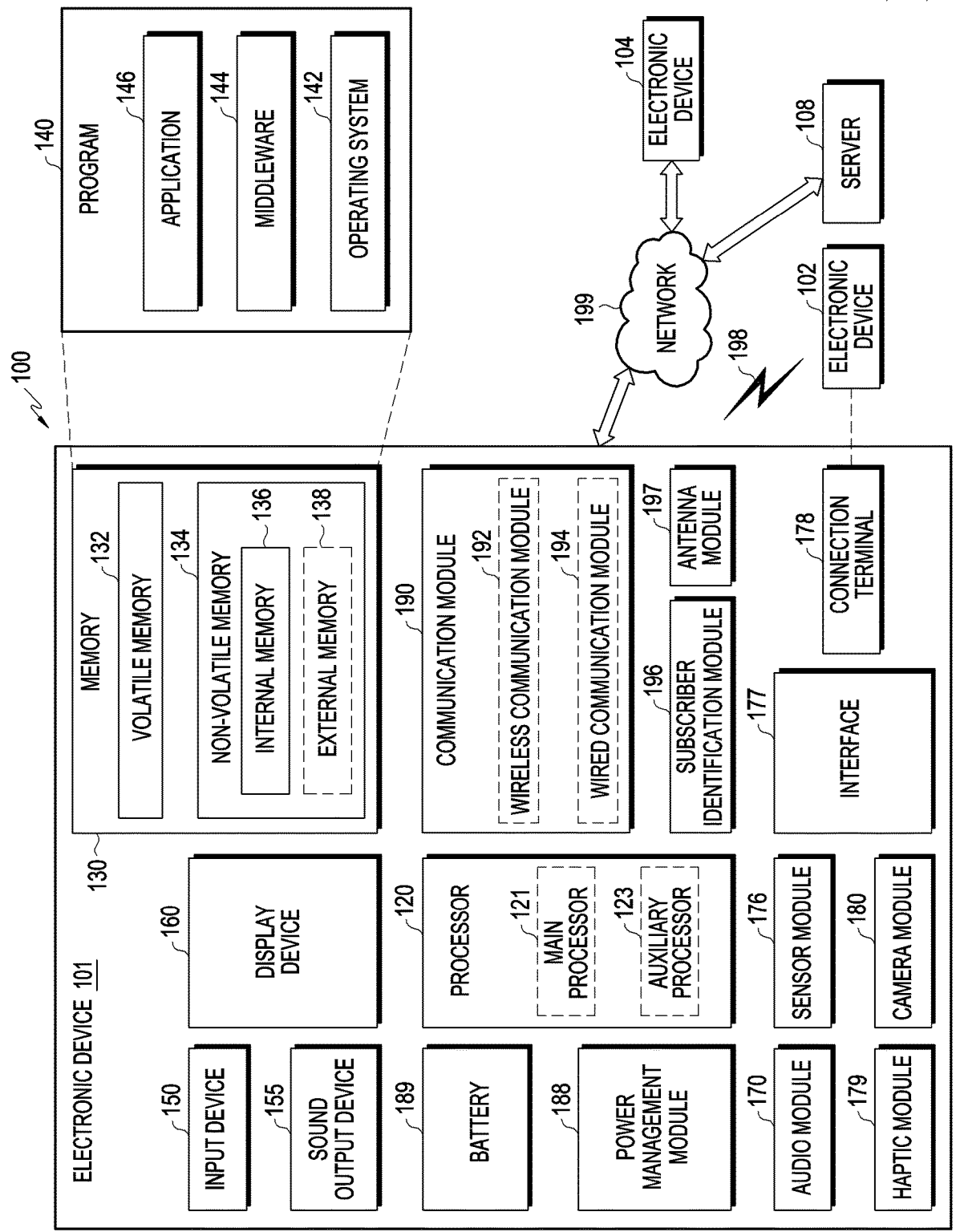
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), and/or an electronic device 104 and/or a server 108 via a second network 199 (e.g., a long-range wireless communication network). According to an embodiment, the electronic device 101 may communicate with the electronic device 104 via the server 108. According to an embodiment, the electronic device 101 may include a processor (e.g., including processing circuitry) 120, a memory 130, an input device (e.g., including input circuitry) 150, a sound output device (e.g., including sound output circuitry) 155, a display device 160, an audio module (e.g., including audio circuitry) 170, a sensor module 176, an interface (e.g., including interface circuitry) 177, a haptic module (e.g., including haptic circuitry) 179, a camera module 180, a power management module 188, a battery 189, a communication module (e.g., including communication circuitry) 190, a subscriber identification module 196, and an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device (160) (e.g., a display).

The processor 120 may include various processing circuitry and drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) and/or an application processor, or the like), and additionally or alternatively, an auxiliary processor 123 (e.g., a graphics processing unit (GPU), an image signal processor, a sensor hub processor, and/or a communication processor, or the like) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 150 may include various input circuitry, such as, for example, and without limitation, a microphone, a mouse, and/or a keyboard, or the like.

The sound output device 155 may be a device for outputting sound signals to the outside of the electronic device 101. The sound output device 155 may include various sound output circuitry, such as, for example, and without limitation, a speaker, or the like, which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 160 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may include various audio circuitry and convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) via wire or wirelessly connected with the electronic device 101.

The sensor module 176 may generate an electrical signal or data value corresponding to an internal operating state (e.g., power or temperature) or external environmental state of the electronic device 101. The sensor module 176 may include, for example, and without limitation, a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, and/or an illuminance sensor, or the like.

The interface 177 may support a designated protocol enabling a wired or wireless connection with an external electronic device (e.g., the electronic device 102). According to an embodiment, the interface 177 may include various interface circuitry, such as, for example, and without limitation, a high definition multimedia interface (HDMI), a universal serial bus (USB) interface, a secure digital (SD) card interface, and/or an audio interface, or the like.

A connecting terminal 178 may include a connector, such as, for example, and without limitation, an HDMI connector, a USB connector, an SD card connector, and/or an audio connector (e.g., a headphone connector), or the like, which is able to physically connect the electronic device 101 with an external electronic device (e.g., the electronic device 102).

The haptic module 179 may include various haptic circuitry and convert an electrical signal into a mechanical stimulus (e.g., a vibration or a movement) or electrical stimulus which may be recognized by a user via his tactile sensation or kinesthetic sensation. The haptic module 179 may include, for example, and without limitation, a motor, a piezoelectric element, and/or an electric stimulator, or the like.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may include various communication circuitry and support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include various modules that include various communication circuitry, such as, for example, and without limitation, a wireless communication module 192 (e.g., a cellular communication module, a short-range wireless communication module, a global navigation satellite system (GNSS) communication module), a wired communication module 194 (e.g., a local area network (LAN) communication module and/or a power line communication (PLC) module), or the like. A corresponding one of the wireless communication module 192 and the wired communication module 194 may be used to communicate with an external electronic device through a first network 198 (e.g., a short-range communication network, such as bluetooth, wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a singe chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands or data) therebetween.

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
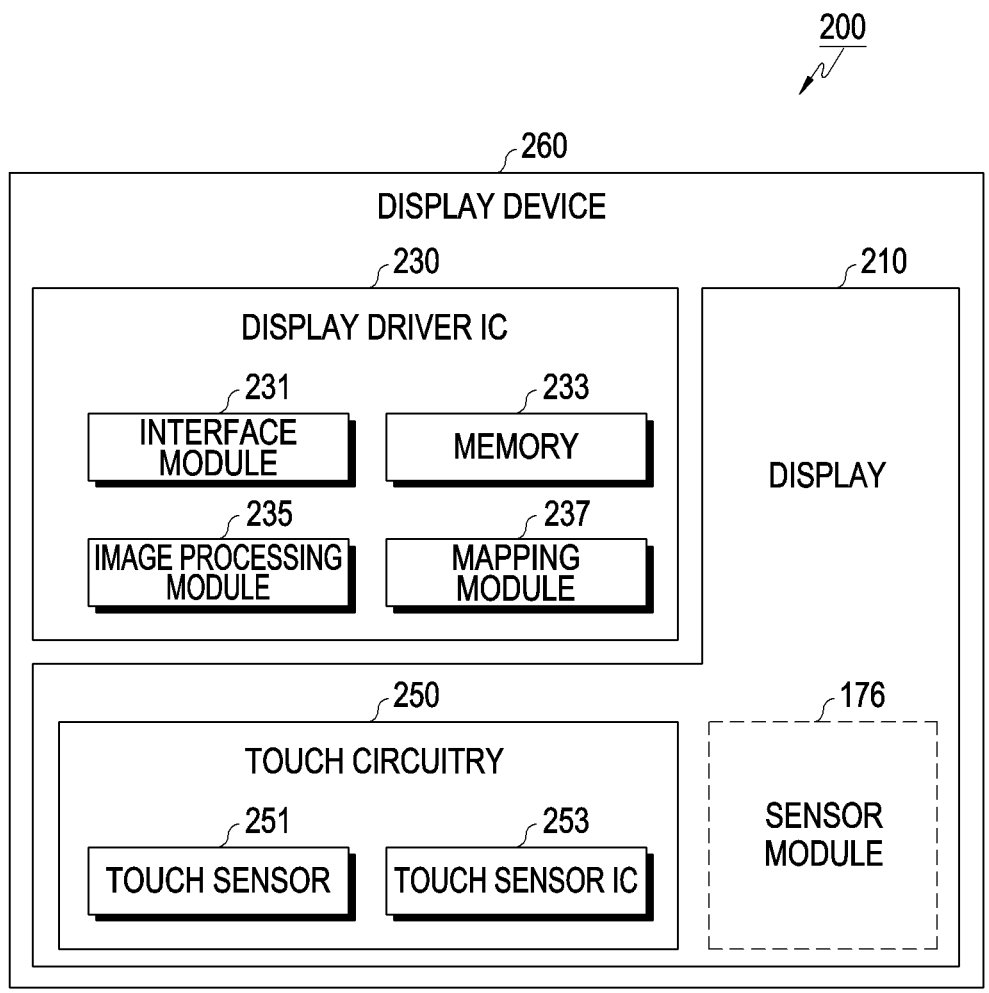
FIG. 2 is a block diagram illustrating a display device according to an embodiment.

FIG. 2 is a block diagram 200 illustrating the display device 260 according to various embodiments. Referring to FIG. 2, the display device 260 may include a display 210 and a display driver integrated circuit (DDI) 230 to control the display 210. The DDI 230 may include an interface module (e.g., including interface circuitry and/or program elements) 231, memory 233 (e.g., buffer memory), an image processing module (e.g., including image processing circuitry) 235, and/or a mapping module (e.g., including mapping circuitry and/or program elements) 237.

The DDI 230 may receive image information that contains image data or an image control signal corresponding to a command for controlling the image data from the processor 120 (e.g., the main processor 121 (e.g., an application processor) or the auxiliary processor 123 operated independently from the function of the main processor 121) through, e.g., the interface module 231. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may convert the image data pre- or post-processed by the image processing module 235 into a voltage value or current value at which pixels of the display 210 may be driven, based on, at least, at least part of attributes of the pixels (e.g., the array (RGB stripe or pentile)) of the pixels or the size of each subpixel). At least some pixels of the display 210 may be driven based on, e.g., the voltage value or current value so that visual information (e.g., text, image, or icon) corresponding to the image data may be displayed on the display 210.

According to an embodiment, the display device 260 may further include the touch circuitry 250. The touch circuitry 250 may include a touch sensor 251 and a touch sensor IC 253 to control the touch sensor 251. The touch sensor IC 253 may control the touch sensor 251, sense a touch input or hovering input at a particular position of the display 210, e.g., by measuring a variation in a signal (e.g., a voltage, quantity of light, resistance, or quantity of electric charge) for the particular position of the display 210, and provide information (e.g., the position, area, pressure, or time) regarding the sensed touch input or hovering input to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 260.

According to an embodiment, the display device 260 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display device 260. For example, when the sensor module 176 embedded in the display device 260 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 260 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include, for example, and without limitation, at least one of, a portable communication device (e.g., a smartphone), a computer device, a portable multimedia device, a portable medical device, a camera, a wearable device, and/or a home appliance, or the like. According to an embodiment of the disclosure, the electronic devices are not limited to those described above.

It should be appreciated that various embodiments of the disclosure and the terms used therein are not intended to limit the techniques set forth herein to particular embodiments and that various changes, equivalents, and/or replacements thereof also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items.

As used herein, the terms "first" and "second" may be used to refer to various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware, or any combinations thereof, and may interchangeably be used with other terms, e.g., "logic," "logic block," "part," or "circuit." A module may be a single integral part or a minimum unit or part for performing one or more functions. For example, and without limitation, the module may be configured in an application-specific integrated circuit (ASIC), or the like.

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

Figure 3A:
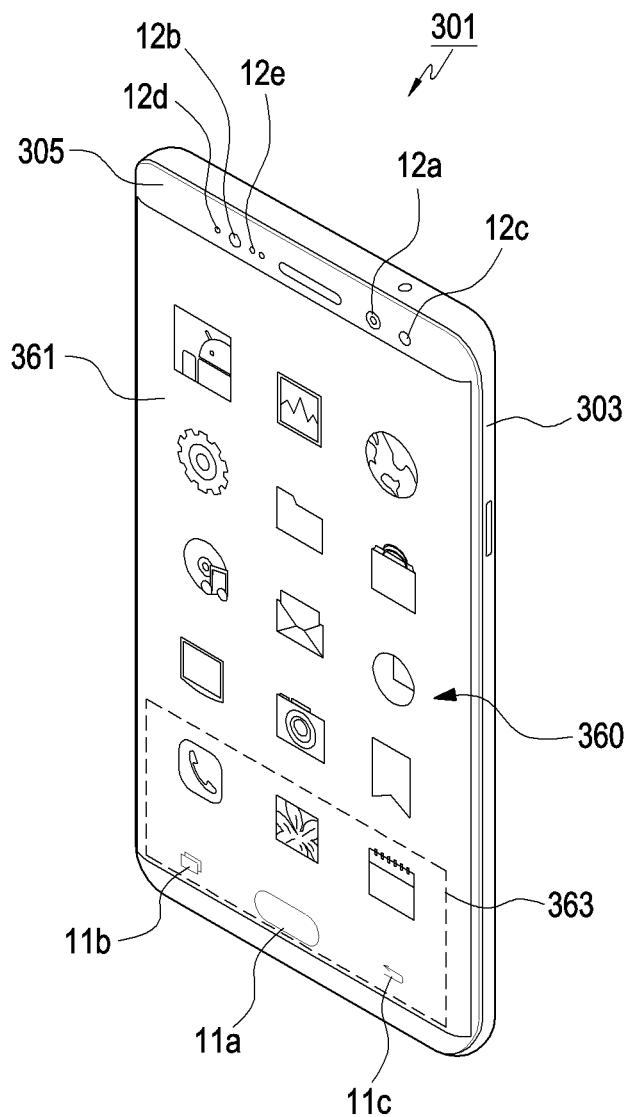
FIG. 3A is a perspective view illustrating an electronic device according to an embodiment.
Figure 3B:
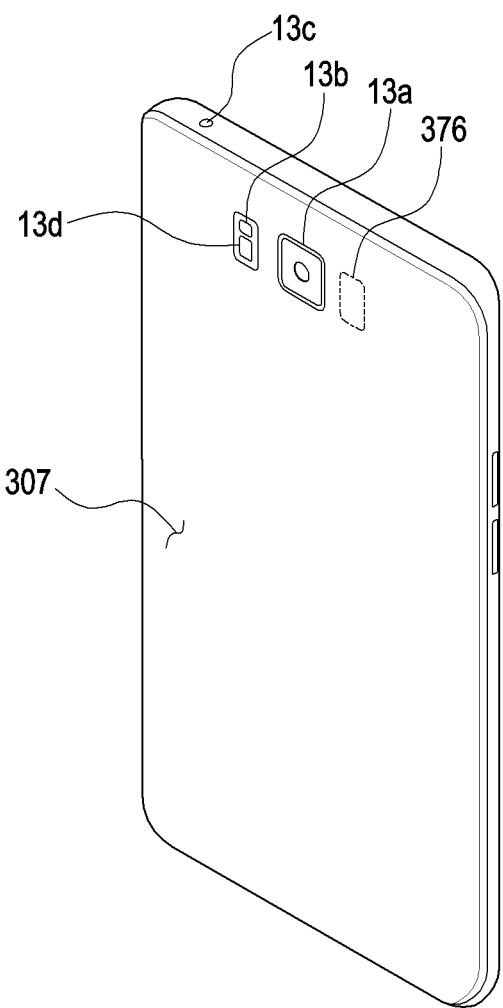
FIG. 3B is a perspective view illustrating an electronic device as viewed in a different direction than that of FIG. 3A.

FIG. 3A is a perspective view illustrating an electronic device according to an embodiment. FIG. 3B is a perspective view illustrating an electronic device as viewed in a different direction from the view of FIG. 3A;

An electronic device 301 (e.g., the electronic device 101) may include a housing 303 and a display 360 (e.g., the display device 160). The housing 303 may include a front surface 305, or a first surface, facing in a first direction and a rear surface 307, or a second surface, facing in a second direction opposite to the first direction. The rear surface 307 of the housing 303 may be a rear cover.

At least a portion of the front surface 305 of the housing 303 may have an opening. The display 360 may include a transparent cover 361 (or a window or cover glass). The display 360 may be mounted in the housing 303 so that the cover 361 forms at least a portion of the front surface 305 of the electronic device 301/housing 303. The cover 361 may be disposed to close the opening of the front surface 305 of the housing 303.

According to an embodiment of the disclosure, the electronic device 301 may include mechanically-operated buttons, touch keys 11*a*, 11*b*, and 11*c* and/or a keypad including at least one of the buttons or touch keys on the front surface 305 of the housing 303 or on a side of the display 360 The touch keys 11*a*, 11*b*, and 11*c* may detect the user's touch inputs.

The housing 303 may receive various electronic parts. The housing 303 may be at least partially formed of a conductive material. The housing 303 may include side walls forming the outer surface of the electronic device 301. A printed circuit part (not shown) and/or a battery (e.g., the battery 189) may be received inside the housing 303. For example, at least one of a processor (e.g., the processor 120), a communication module (e.g., the communication module 190), various interfaces (e.g., the interface 177), or a power management module (e.g., the power management module 188) may be mounted on the printed circuit part (not shown) in the form of an integrated chip (IC).

According to an embodiment of the disclosure, the electronic device 301 may include a first camera 12a (e.g., the camera module 180), a light source 12b, or an iris camera 12c on an upper portion of the front surface. For example, the light source 12b may include an infrared (IR) light emitting diode (LED). The iris camera 12c may capture the user's eye or iris irradiated with a red near-infrared ray output from the IR LED.

According to an embodiment of the disclosure, the electronic device 301 may include a light source indicator lamp 12d, an illuminance sensor, and/or a proximity sensor 12e on the upper portion of the front surface.

According to an embodiment of the disclosure, the electronic device 301 may include a second camera 13a (e.g., the camera module 180), a heart rate monitor (HRM) 13d, and/or a flash 13b on the rear surface 307. The electronic device 301 may include a microphone 13c on the top.

The display 360 may be exposed through the front surface 305 of the housing 303. The display 360 may include a cover 361 and a display panel. According to an embodiment of the disclosure, the display 360 may include a touch panel between the cover 361 and the display panel. The display 360 may output a home screen or application screens. The display 360 may detect touch inputs on the home screen or the application screens.

According to an embodiment of the disclosure, the electronic device 301 may include a rear cover to protect the rear surface 307 of the housing 303. The rear cover may be mounted on the housing 303 to face in the opposite direction (the second direction) of the display 360. The rear cover, together with the housing 303 and the display 360, may form the outer appearance of the electronic device 301.

According to an embodiment of the disclosure, at least a portion of an active area (or area where display pixels are actually arranged or an area to display screens) of the display 360 or a fingerprint sensor area 363 may be provided as a fingerprint sensor, or its portion, for recognizing fingerprints.

According to an embodiment, a fingerprint sensor 376 may be provided in the rear surface 307 of the electronic device 301.

Figure 4A:
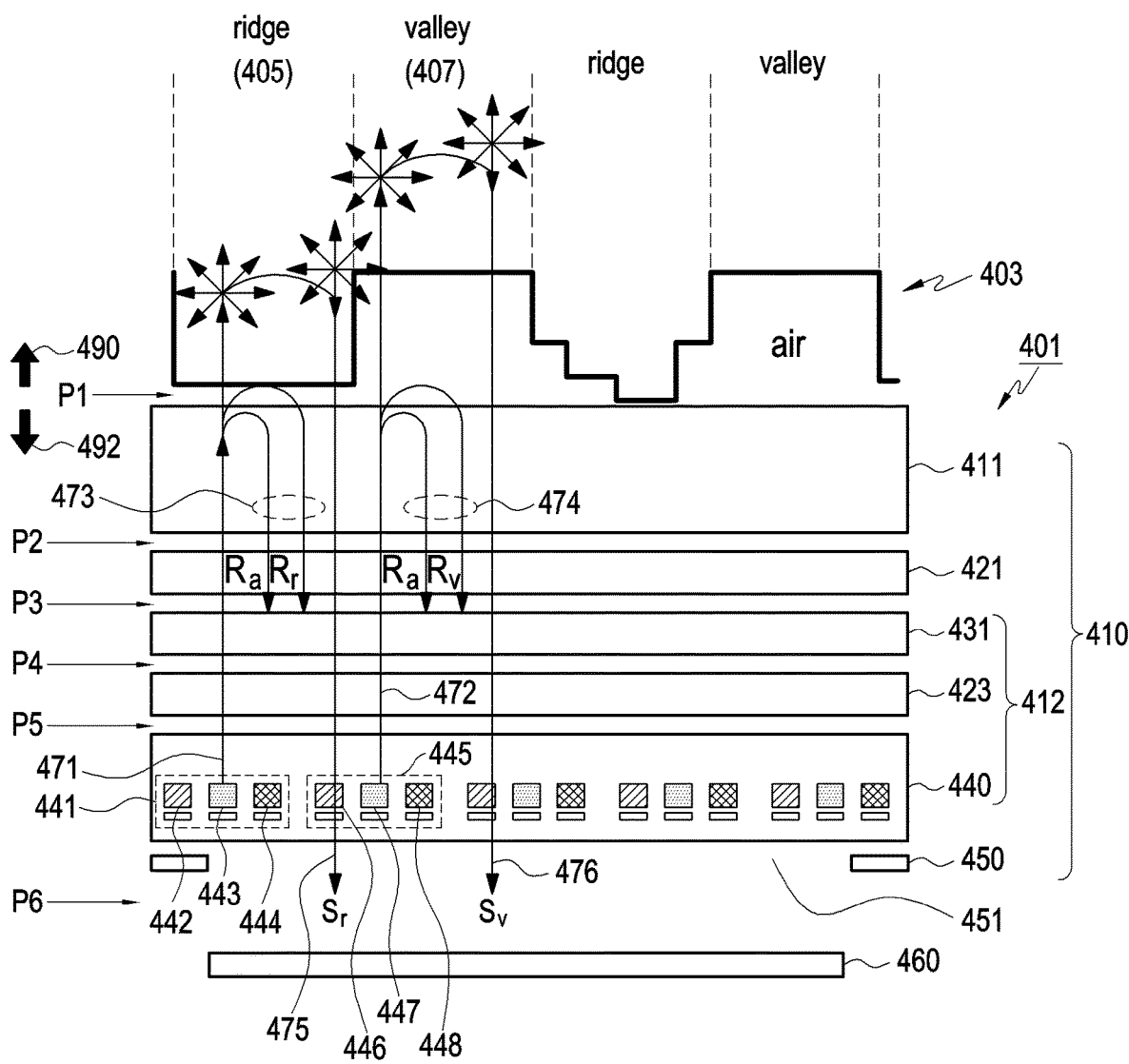
FIG. 4A is a diagram illustrating an electronic device according to an embodiment.

FIG. 4A is a diagram illustrating an electronic device according to an embodiment.

An electronic device 401 (e.g., the electronic device 101 or 301) may include a display 410 (e.g., the display device 160 or the display 360), and a fingerprint detecting device 460 (e.g., the fingerprint sensor area 363 or the fingerprint sensor 376). A portion (e.g., the fingerprint sensor area 363) of the display 410 illustrated in FIG. 4A and the fingerprint detecting device 460 may correspond to fingerprint sensors of the electronic device 401. According to an embodiment, the fingerprint detecting device 460 may correspond to a portion of the display 410.

According to an embodiment, the display 410 may include a display panel 412. The display panel 412 may include a first polarizer 431, a second phase retarder 423, and a light source 440. The phase retarder may also be referred to hereinafter as a retarder, retardation layer, phase retardation plate, or waveplate. The display 410 may include a transparent cover 411 (e.g., the cover 361), a first phase retarder 421, the display panel 412, and a buffer 450. The cover may also be referred to hereinafter as a transparent member, window, or cover glass.

According to an embodiment, the first phase retarder 421 may convert linear polarization into circular polarization or vice versa. The first phase retarder 421 may maintain non-polarization.

The cover 411 may be disposed on the front surface of the electronic device 401 or housing (e.g., the housing 403) or may be disposed to form at least a portion of the front surface.

The first phase retarder 421 may be disposed between the cover 411 and the light source 440 or between the cover 411 and the first polarizer 431. The first phase retarder 421 may be configured to change the polarization of incident light between linear polarization and non-linear polarization. For example, the first phase retarder 421 may be configured to change the polarization of incident light between linear polarization and circular polarization (or elliptical polarization). For example, the first phase retarder 421 may include a $\lambda/4$ waveplate or a $(2n+1)\lambda/4$ waveplate (where, n is a positive integer)

The first polarizer 431 may be disposed between the cover 411 and the light source 440 or between the first phase retarder 421 and the light source 440. The first polarizer 431 may be configured to linearly polarize incident light. The first polarizer 431 may be configured to change the polarization of incident light from non-polarization to linear polarization. The first polarizer 431 may be configured to transmit a first polarization component (e.g., a parallel polarization (P-polarization) component) of incident light while at least partially blocking a second polarization component (e.g., a perpendicular polarization (S-polarization) component) of the incident light. The polarization direction of the first polarization component may be perpendicular to the polarization direction of the second polarization component.

The second phase retarder 423 may be disposed between the cover 411 and the light source 440 or between the first phase retarder 421 and the light source 440. The second phase retarder 423 may be configured to change the polarization of incident light between linear polarization and non-linear polarization. For example, the second phase retarder 423 may be configured to change the polarization of incident light from linear polarization to circular polarization or elliptical polarization. For example, the second phase retarder 423 may include a $\lambda/4$ waveplate or a $(2n+1)\lambda/4$ waveplate (where, n is a positive integer). According to an embodiment, the second phase retarder 423 may change the phase of incident light by substantially 90 degrees. The phase change may turn linear polarization into circular polarization or elliptical polarization. For example, when parallel-polarized (P-polarized) light enters the $\lambda/4$ waveplate at 45 degrees with respect to the fast axis of the $\lambda/4$ waveplate, the $\lambda/4$ waveplate may cause a phase difference of 90 degrees between the polarization component as per the fast axis (or, on or parallel to the fast axis) and the polarization component as per the axis perpendicular to the fast axis (or, on or parallel to the axis perpendicular to the fast axis), converting the parallel polarization into right-handed circular polarization. On the other hand, when left-handed circular-polarized light comes into the $\lambda/4$ waveplate, the λ/4 waveplate may convert the left-handed circular polarization into perpendicular polarization (S-polarization). The light source 440 may be configured to output first light in a first direction 490. The first direction 490 may be a direction from the fingerprint detecting device 460 to the cover 411.

The buffer 450 may be stacked on the surface of the light source 440 that faces the fingerprint detecting device 460. The buffer 450 may include an opening 451 in a position corresponding to the fingerprint detecting device 460.

The fingerprint detecting device 460 may include an image sensor configured to detect at least a portion of third light. According to an embodiment, the fingerprint detecting device 460 or the image sensor may be formed on the rear surface of the light source 440, or may be formed on or in a layer of pixels in the light source 440, or may be formed between the pixels in the light source 440).

According to an embodiment, the fingerprint detecting device 460 may be attached to the buffer 450 to cover the opening 451. According to an embodiment, the fingerprint detecting device 460 may be wider than the opening 451, and the border (or the peripheral portion) of the fingerprint detecting device 460 may be attached onto the surface (or second surface) of the buffer 450 that faces the fingerprint detecting device 460. By making the fingerprint detecting device 460 wider than the opening 451, the user may not notice the fingerprint detecting device 460. The electronic device 401 or a processor (e.g., the processor 120) of the electronic device 401 may control the light source 440 to emit first light to the cover 411. The electronic device 401 may block second light reflected from the user's skin/fingerprint 403 or the cover 411 using the first phase retarder 421, the first polarizer 431, and the second phase retarder 423. The electronic device 401 or the processor of the electronic device 401 may detect at least a portion of the third light coming from the user's skin using the fingerprint detecting device 460. The at least portion of the third light detected may represent a fingerprint image.

The light source 440 may include a plurality of pixels 441 and 445 arrayed in a matrix structure of M rows and N columns. Each pixel 441 or 445 may include a red (R) sub-pixel 442 or 446, a green (G) sub-pixel 443 or 447, and a blue (B) sub-pixel 444 or 448. The light source 440 may be configured to allow each pixel to emit first light in the first direction 490 according to a selected combination of the RGB sub-pixels. For example, the first light may include a first test light ray 471 emitted from the first pixel 441 and a second test light ray 472 emitted from the second pixel 445. For example, the first pixel 441 may output, as the first test light ray 471, a combination of green light emitted from the G sub-pixel 443 and blue light emitted from the B sub-pixel 444. For example, the second pixel 445 may output, as the second test light ray 472, a combination of green light emitted from the G sub-pixel 447 and blue light emitted from the B sub-pixel 448.

The first light which is non-polarized and emitted from the light source 440 in the first direction 490 may sequentially pass through the second phase retarder 423 and the first polarizer 431. The first polarizer 431 may be configured to change the polarization of the first light from non-polarization to first linear polarization (e.g., the parallel polarization (P-polarization)). The first light linear-polarized by the first polarizer 431 may pass through the first phase retarder 421. The first phase retarder 421 may be configured to change the polarization of the first light from the first linear polarization to first non-linear polarization (e.g., right-handed circular polarization). The first light non-linearly polarized may pass through the cover (or transparent member) 411. The first light transmitted through the cover 411 may be incident through the air layer to the fingerprint 403. For example, the first test light ray 471 transmitted through the cover 411 may be incident onto the ridge 405 of the fingerprint 403, and the second test light ray 472 transmitted through the cover 411 may be incident onto the valley 407 of the fingerprint 403.

Second light, a portion of the first light, reflected from the surface of the fingerprint 403 and the surface (or a first surface) of the cover 411 which is positioned opposite the fingerprint 403, may propagate in a second direction 492 which is opposite to the first direction 490. By reflection, the second light may be rendered to have second non-linear polarization (e.g., left-handed circular polarization). For example, the second light may include a first reflection light 473 which is a portion of the first test light ray 471 and a second reflection light 474 which is a portion of the second test light ray 472. Since an air gap is present between the surface of the cover 411 and the ridge, the first reflection light 473 may include a first component $R_a$ reflected from the surface of the cover 411 and a second component $R_r$ reflected from the surface of the ridge 405. The second reflection light 474 may include a first component $R_a$ reflected from the surface of the cover 411 and a third component $R_v$ reflected from the surface of the valley 407. The second light may pass through the first phase retarder 421. According to an embodiment, the first phase retarder 421 may be configured to change the polarization of the second light from the second non-linear polarization to second linear polarization (e.g., perpendicular polarization (S-polarization)). The linear-polarized second light may at least partially be blocked by the first polarizer 431.

According to an embodiment, the phase retarder (or retardation layer) may delay the phase of incident light by about 90 degrees, changing the polarization direction/state of the light from linear polarization to circular polarization or from circular polarization to linear polarization.

Another portion of the first light incident onto the fingerprint 403 may be scattered under the user's skin and may then be emitted from the user's skin or fingerprint 403. Third light which is light scattered from the user's fingerprint 403 may travel in the second direction 492 which is opposite to the first direction 490. The scattering may allow the third light to have non-polarization. For example, the third light may include first scattered light 475 coming from the ridge 405 of the fingerprint 403 and second scattered light 476 coming from the valley 407 of the fingerprint 403. The third light may sequentially pass through the cover 411, the first phase retarder 421, and the first polarizer 431. The first polarizer 431 may be configured to change the polarization of the first light from non-polarization to first linear polarization (e.g., the parallel polarization (P-polarization)). The third light linear-polarized by the first polarizer 431 may pass through the second phase retarder 423. The second phase retarder 423 may be configured to change the polarization of the third light from the first linear polarization to first non-linear polarization (e.g., right-handed circular polarization). The third light transmitted through the light source 440 may be incident through the air layer to the fingerprint detecting device 460. The fingerprint detecting device 460 may detect at least a portion of the third light. The at least portion of the third light detected may represent a fingerprint image.

Table 1 may represent the polarization of each light beam per position (P1, P2, P3, P4, P5, or P6).

TABLE 1

| Position | First light | Second light | Third light |
| --- | --- | --- | --- |
| P1 | right-handed circular polarization | left-handed circular polarization | non-polarization |
| P2 | right-handed circular polarization | left-handed circular polarization | non-polarization |
| P3 | P-polarization | S-polarization | non-polarization |
| P4 | non-polarization | blocked | P-polarization |
| P5 | non-polarization | no corresponding light beam | right-handed circular polarization |
| P6 | no corresponding light beam | no corresponding light beam | right-handed circular polarization |

Figure 4B:
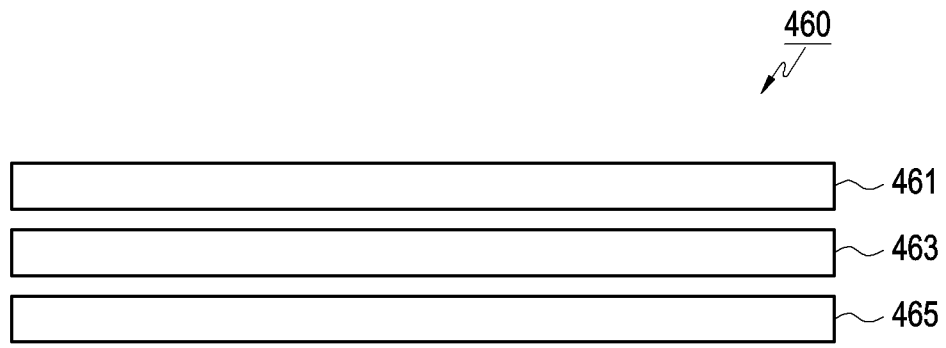
FIG. 4B is a diagram illustrating a fingerprint detecting device according to an embodiment.

FIG. 4B is a diagram illustrating a fingerprint detecting device 460 according to an embodiment.

The fingerprint detecting device 460 may include at least one of an image sensor 465, a filter 461, and a lens 463.

The filter 461 may be disposed between the light source 440 and the image sensor 465. The filter 461 may be configured to transmit/block light with a preset wavelength/frequency band. The filter 461 may be configured to transmit the third light of a preset wavelength/frequency band which has passed through the light source 440 while blocking the light of the other wavelengths/frequency bands. For example, where the light source 440 is configured to output green light emitted from the G sub-pixel 443 or 447 among the RGB sub-pixels, the filter 461 may be configured to transmit the green wavelength of light while blocking the other wavelengths/frequency bands of light.

According to an embodiment, the lens 463 may be disposed between the light source 440 and the image sensor 465. The positions of the filter 461 and the lens 463 may be reversed. The lens 463 may collimate, or make parallel, the light transmitted through the filter 461 or light source 440. For example, the lens 463 may include at least one of a combination of a plurality of micro-lenses, a combination of optical fiber lenses, or a combination of a plurality of pinhole lenses.

The image sensor 465 may detect the light transmitted through the filter 461 and/or lens 463 as an image/image signal/image data.

Figure 4C:
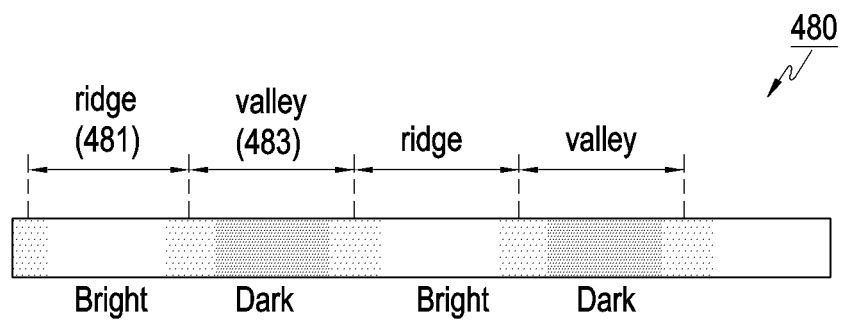
FIG. 4C is a diagram illustrating a portion of a fingerprint image according to an embodiment.

FIG. 4C is a diagram illustrating a portion of a fingerprint image according to an embodiment.

The fingerprint image 480 detected by the image sensor 465 may include a brighter first image portion 481 corresponding to the ridge 405 of the fingerprint 403 and a darker second image portion 483 corresponding to the valley 407 of the fingerprint 403.

When the fingerprint is detected in the position P2, the first image portion corresponding to the ridge 405 of the fingerprint 403 may be formed by the first reflection light 473 and the first scattered light 475, and the second image portion corresponding to the valley 407 of the fingerprint 403 may be formed by the second reflection light 474 and the second scattered light 476. Since an air gap is present between the surface of the cover 411 and the ridge, the first reflection light 473 may include a first component reflected from the surface of the cover 411 and a second component reflected from the surface of the ridge 405. The second reflection light 474 may include a first component reflected from the surface of the cover 411 and a third component reflected from the surface of the valley 407. It may be assumed that the light strength (or brightness/power) of the first component, the light strength of the second component, the light strength of the third component, the light strength of the first scattered light 475, and the light strength of the second scattered light 476 are $R_a$, $R_r$, $R_v$, $S_r$, and $S_v$, respectively. Under such an assumption, the following relationship may be met.

$$\Delta = |(Sr+Rr+Ra)/(Sv+Rv+Ra)| \approx 1$$

In the fingerprint image detected at the position P2, it may be difficult to clearly distinguish the first image portion 481 corresponding to the ridge 405 of the fingerprint 403 from the second image portion 483 corresponding to the valley 407 of the fingerprint 403.

By at least partially blocking the first reflection light 473 and the second reflection light 474 using the first phase retarder 421, most of the first image portion 481 corresponding to the ridge 405 of the fingerprint 403 in the fingerprint image 480 detected by the image sensor 465 may be formed by the first scattered light 475, and most of the second image portion 483 corresponding to the valley 407 of the fingerprint 403 may be formed by the second scattered light 476. Since Sr>>Sv, the first image portion 481 and the second image portion 483 may be clearly distinguished from each other.

Since a light scattering occurs in the dermis of the fingerprint skin and is not likely to occur from a forged fingerprint (e.g., a fingerprint photo or a fingerprint-engraved rubber), the electronic device 401 may provide anti-spoofing functionality.

According to an embodiment, a display (e.g., the display device 160 or the display 360 or 410) may comprise a transparent cover (e.g., the cover 361 or 411), a light source (e.g., the light source 440) configured to emit first light in a first direction, a first polarizer (e.g., the first polarizer 431) disposed between the light source and the cover and configured to linearly polarize the first light, and a first retarder (e.g., the first phase retarder 421) disposed between the first polarizer and the cover and configured to change a polarization of the first light from a linear polarization to a non-linear polarization.

According to an embodiment, the first polarizer may be configured to at least partially block second light, the second light being a portion of the first light reflected in a second direction opposite the first direction.

According to an embodiment, the first retarder is configured to change polarization of the second light from non-linear polarization to linear polarization.

According to an embodiment, the first polarizer is configured to linearly polarize third light that is incident from an outside of the display to an inside of the display.

According to an embodiment, the display may further comprise a second retarder (e.g., the second phase retarder 423) disposed between the light source and the first polarizer and configured to change a polarization of the third light from a linear polarization to a non-linear polarization.

According to an embodiment, the third light may be a portion of the first light that is incident onto a user's skin and which is scattered.

According to an embodiment, the display may further comprise at least one anti-reflection coat (or layer) disposed on at least one surface of the first retarder.

According to an embodiment, the display may further comprise at least one refractive index matching layer disposed on at least one surface of the first retarder.

According to an embodiment, an electronic device (e.g., the electronic device 101, 301, or 401) may comprise a transparent cover, a light source configured to emit first light in a first direction, a first polarizer disposed between the light source and the cover and configured to linearly polarize the first light, a first retarder disposed between the first polarizer and the cover and configured to change polarization of the first light from a linear polarization to a non-linear polarization, and an image sensor (e.g., the image sensor 465) configured to detect third light transmitted through the light source and forming a fingerprint image.

According to an embodiment, the first polarizer may be configured to linearly polarize third light that is incident from an outside of the electronic device to an inside of the electronic device.

According to an embodiment, the electronic device may further comprise a second retarder disposed between the light source and the first polarizer and configured to change a polarization of the third light from a linear polarization to a non-linear polarization.

According to an embodiment, the electronic device may further comprise at least one anti-reflection coat (or layer) disposed on at least one surface of the first retarder.

According to an embodiment, the electronic device may further comprise at least one refractive index matching layer disposed on at least one surface of the first retarder.

According to an embodiment, the electronic device may further comprise a second polarizer disposed between the light source and the image sensor and configured to linearly polarize fourth light that is emitted from the light source in a second direction opposite to the first direction.

According to an embodiment, the electronic device may further comprise a third retarder disposed between the second polarizer and the light source and configured to change a polarization of the third light from a non-linear polarization to a linear polarization.

According to an embodiment, the electronic device may further comprise a lens disposed between the light source and the image sensor and configured to control a direction in which at least a portion of the third light propagates.

According to an embodiment, the electronic device may further comprise a filter disposed between the light source and the image sensor and configured to transmit a preset band of light.

According to an embodiment, an electronic device (e.g., the electronic device 101, 301, or 401) may comprise a housing (e.g., the housing 303), a transparent member comprising a transparent cover forming at least a portion of an outer surface of the electronic device and disposed in at least a portion of the housing, a display panel at least partially received in the housing, a retardation layer disposed between the transparent member and the display panel and configured to allow light incident through the transparent member to the display panel to be phase-retarded by substantially 90 degrees, and an image sensor formed in or under at least a portion of the display panel and configured to obtain at least a portion of the light incident through at least a portion of the display panel and the retardation layer.

According to an embodiment, the display panel may be configured to emit the light to the transparent member.

According to an embodiment, the display panel may include a polarizer configured to linearly polarize the light and another retardation layer configured to allow the incident light to be phase-retarded by substantially 90 degrees.

According to an embodiment, the polarizer may be configured to block light reflected from the transparent member, and the image sensor may be configured to obtain light not blocked by the polarizer.

According to an embodiment, the display panel may include the retardation layer.

Figure 5:
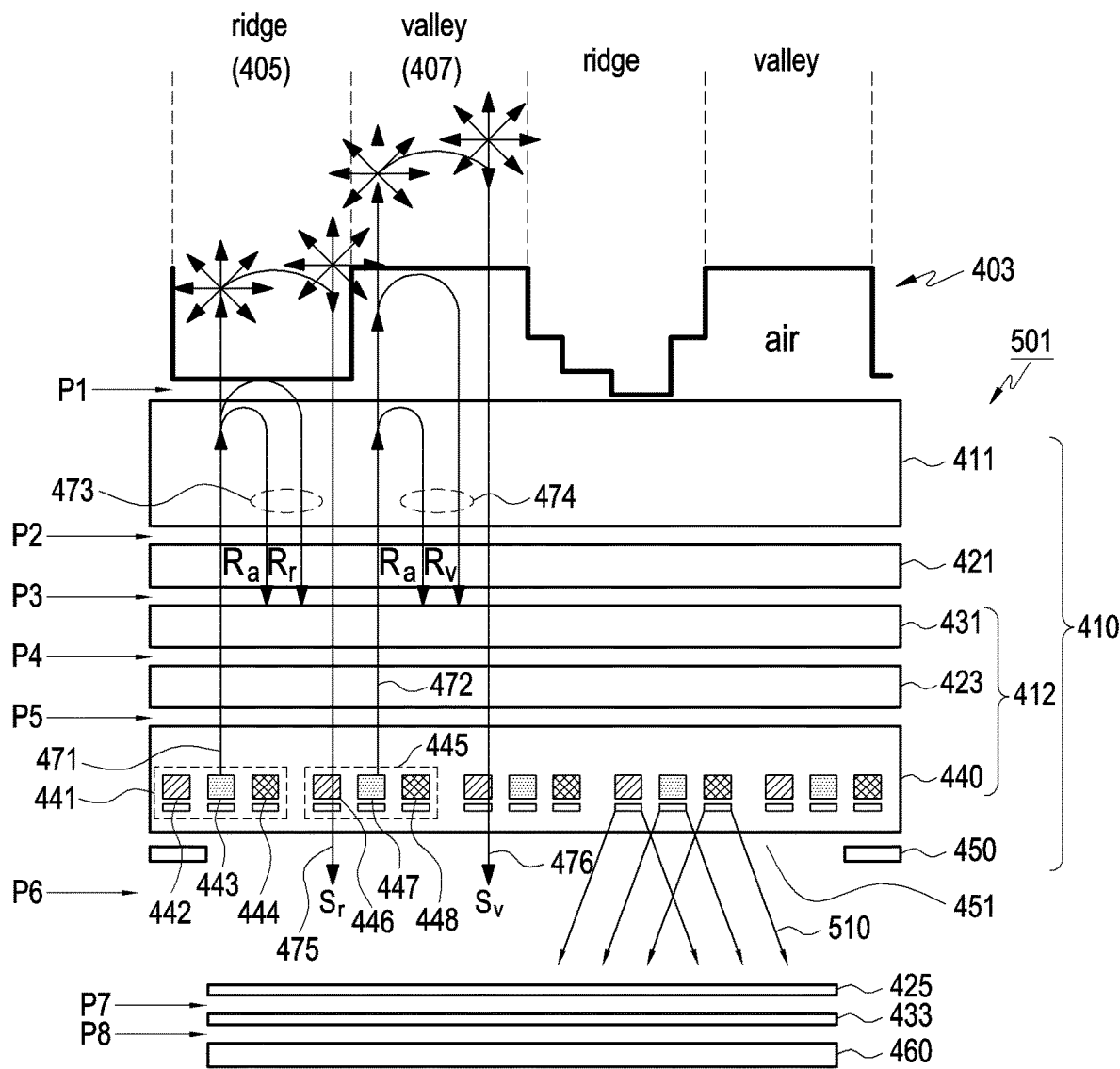
FIG. 5 is a diagram illustrating an electronic device where a backlight is blocked according to an embodiment.

FIG. 5 is a diagram illustrating an electronic device where backlight is blocked according to an embodiment.

An electronic device 501 (e.g., the electronic device 101, 301, or 401) may include a display 410 (e.g., the display device 160 or the display 360), and a fingerprint detecting device 460 (e.g., the fingerprint sensor area 363 or the fingerprint sensor 376). The display 410 may include a display panel 412. The display panel 412 may include a first polarizer 431, a second phase retarder 423, and a light source 440. The display 410 may include a transparent cover 411 (e.g., a transparent member, glass, or cover glass), a first phase retarder 421 (or a retardation layer or phase retardation plate), the display panel 412, and a buffer 450. A portion (e.g., the fingerprint sensor area 363) of the display 410 illustrated in FIG. 5 and the fingerprint detecting device 460 may correspond to fingerprint sensors of the electronic device 501. According to an embodiment, the fingerprint detecting device 460 may correspond to a portion of the display 410.

The electronic device 501 may further include a third phase retarder 425 and a second polarizer 433. According to an embodiment, the third phase retarder 425 and the second polarizer 433 may be implemented in one layer (e.g., a circular polarizer).

The description of the components of the electronic device 401 of FIG. 4A may apply to their respective corresponding components (or components with the same/similar names) in the electronic device 501, and a repetitive description is not repeated here.

The third phase retarder 425 may be disposed between the light source 440 and the fingerprint detecting device 460. The third phase retarder 425 may be configured to change the polarization of incident light between linear polarization and non-linear polarization. For example, the third phase retarder 425 may be configured to change the polarization of incident light between linear polarization and circular/elliptical polarization.

The second polarizer 433 may be disposed between the light source 440 and the fingerprint detecting device 460 or between the third phase retarder 425 and the fingerprint detecting device 460. The second polarizer 433 may be configured to linearly polarize incident light. The second polarizer 433 may be configured to change the polarization of incident light from non-polarization to linear polarization. The second polarizer 433 may be configured to transmit a first polarization component (e.g., a parallel polarization (P-polarization) component) of incident light while at least partially blocking a second polarization component (e.g., a perpendicular polarization (S-polarization) component) of the incident light.

The third light may sequentially pass through the light source 440 and the third phase retarder 425. The third phase retarder 425 may be configured to change the polarization of the third light from the first non-linear polarization (e.g., right-handed circular polarization) to the first linear polarization (e.g., P-polarization). The third light may pass through the second polarizer 433. The third light transmitted through the second polarizer 433 may be incident through the air layer to the fingerprint detecting device 460. The fingerprint detecting device 460 may detect at least a portion of the third light. The at least portion of the third light detected may represent a fingerprint image.

Fourth light 510 (e.g., the backlight of the light source 440) which is non-polarized and emitted from the light source 440 in the second direction may sequentially pass through the third phase retarder 425 and the second polarizer 433. The second polarizer 433 may be configured to change the polarization of the fourth light 510 from non-polarization to first linear polarization (e.g., the parallel polarization (P-polarization)). The second polarizer 433 may reduce the amount of the fourth light incident onto the fingerprint detecting device 460 by at least partially blocking the second polarization component (e.g., the perpendicular polarization (S-polarization) component) of the fourth light 510. The reduction in the amount of the fourth light 510 may suppress the fourth light 510 from being reflected from the fingerprint detecting device 460 to the user, thus deteriorating the visibility of the fingerprint detecting device 460.

Table 2 may represent the polarization of each light beam per position (P1, P2, P3, P4, P5, P6, P7, or P8).

TABLE 2

| Location | First light | Second light | Third light | Fourth light |
|---|---|---|---|---|
| P1 | right-handed circular polarization | left-handed circular polarization | non-polarization | no corresponding light beam |
| P2 | right-handed circular polarization | left-handed circular polarization | non-polarization | no corresponding light beam |
| P3 | P-polarization | S-polarization | non-polarization | no corresponding light beam |
| P4 | non-polarization | blocked | P-polarization | no corresponding light beam |
| P5 | non-polarization | no corresponding light beam | right-handed circular polarization | no corresponding light beam |
| P6 | no corresponding light beam | no corresponding light beam | right-handed circular polarization | non-polarization |
| P7 | no corresponding light beam | no corresponding light beam | P-polarization | non-polarization |
| P8 | no corresponding light beam | no corresponding light beam | P-polarization | P-polarization |

Figure 6:
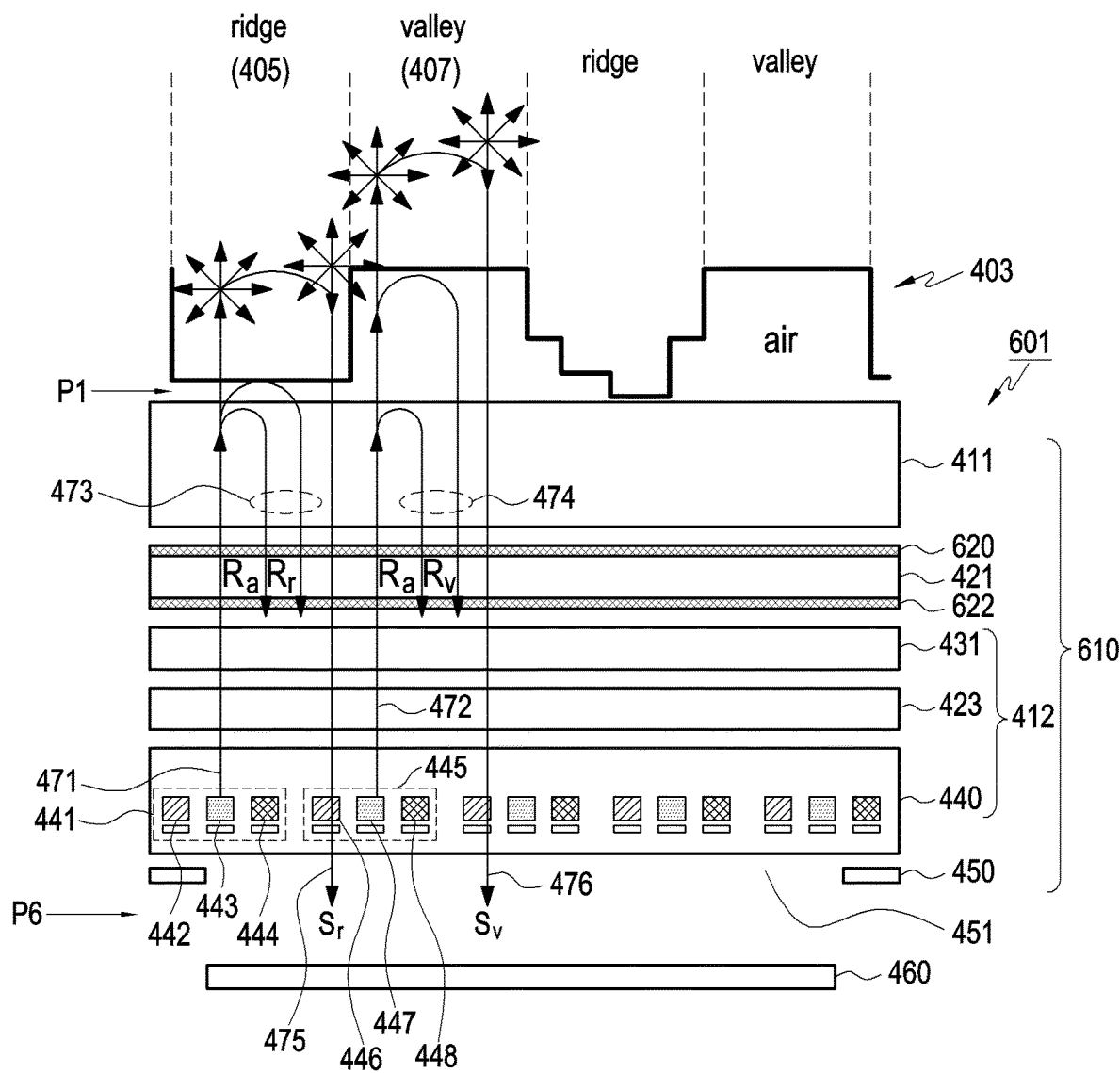
FIG. 6 is a diagram illustrating an electronic device where an anti-reflection layer is applied according to an embodiment.

FIG. 6 is a diagram illustrating an electronic device where an anti-reflection layer is applied according to an embodiment.

An electronic device 601 (e.g., the electronic device 101 or 301) may include a display 610 (e.g., the display device 160 or the display 360), and a fingerprint detecting device 460 (e.g., the fingerprint sensor area 363 or the fingerprint sensor 376). The display 610 may include a display panel 412. The display panel 412 may include a first polarizer 431, a second phase retarder 423, and a light source 440. The display 410 may include a transparent cover 411 (e.g., a transparent member, glass, or cover glass), a first phase retarder 421 (or a retardation layer or phase retardation plate), the display panel 412, and a buffer 450. A portion (e.g., the fingerprint sensor area 363) of the display 610 illustrated in FIG. 6 and the fingerprint detecting device 460 may correspond to fingerprint sensors of the electronic device 601. According to an embodiment, the fingerprint detecting device 460 may correspond to a portion of the display 610.

The electronic device 601 may further include a first anti-reflection layer 620 and/or a second anti-reflection layer 622.

The description of the components of the electronic device 401 of FIG. 4A may apply to their respective corresponding components (or components with the same/similar names) in the electronic device 601, and a repetitive description is not repeated here.

The first anti-reflection layer 620 may be stacked on a first surface of the first phase retarder 421 that faces the cover 411. The second anti-reflection layer 622 may be stacked on a second surface of the first phase retarder 421 that faces the first polarizer 431. The first and second anti-reflection layers 620 and 622 may be configured to minimize the reflection of light incident thereonto. The first and second anti-reflection layers 620 and 622 each may include a stack of higher reflective layers (e.g., $Nb_2O_5$ layers) and lower reflective layers (e.g., $SiO_2$ layers).

According to an embodiment, an anti-reflection layer may be disposed on a first surface and/or second surface of a component (e.g., the first polarizer 431 or second phase retarder 423) of the electronic device 601, other than the first phase retarder 421.

Figure 7:
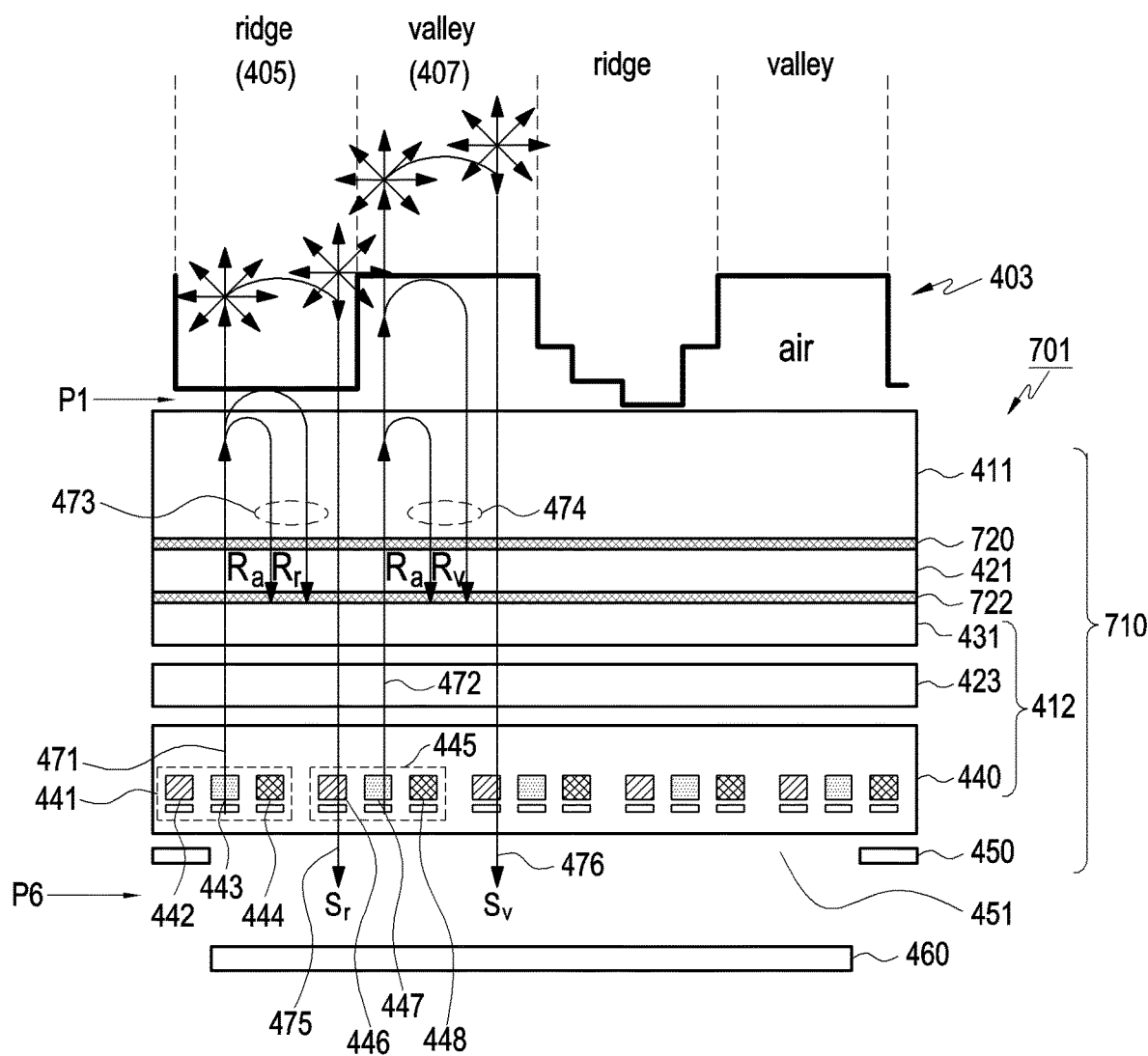
FIG. 7 is a diagram illustrating an electronic device where a refractive index matching layer is applied according to an embodiment.

FIG. 7 is a diagram illustrating an electronic device where a refractive index matching layer is applied according to an embodiment.

An electronic device 701 (e.g., the electronic device 101 or 301) may include a display 710 (e.g., the display device 160 or the display 360), and a fingerprint detecting device 460 (e.g., the fingerprint sensor area 363 or the fingerprint sensor 376). The display 710 may include a transparent cover 411 (or a window or a cover glass) (e.g., the cover 361), a first phase retarder 421 (or a phase retardation plate), a first polarizer 431, a second phase retarder 423, a light source 440, and a buffer 450. A portion (e.g., the fingerprint sensor area 363) of the display 710 illustrated in FIG. 7 and the fingerprint detecting device 460 may correspond to fingerprint sensors of the electronic device 701. According to an embodiment, the fingerprint detecting device 460 may correspond to a portion of the display 710.

The electronic device 701 may further include a first refractive index matching layer 720 and/or a second refractive index matching layer 722.

The description of the components of the electronic device 401 of FIG. 4A may apply to their respective corresponding components (or components with the same/similar names) in the electronic device 701, and a repetitive description is not repeated here.

The first refractive index matching layer 720 may be disposed between the cover 411 and the first phase retarder 421. According to an embodiment, the cover 411 and the first phase retarder 421 may be attached to each other by the first refractive index matching layer 720. According to an embodiment, the first refractive index matching layer 720 may have a medium/mean refractive index between the refractive index of the cover 411 and the refractive index of the first phase retarder 421. The second refractive index matching layer 722 may be disposed between the first phase retarder 421 and the first polarizer 431. According to an embodiment, the first phase retarder 421 and the first polarizer 431 may be attached to each other by the second refractive index matching layer 722. According to an embodiment, the second refractive index matching layer 722 may have a medium/mean refractive index between the refractive index of the first phase retarder 421 and the refractive index of the first polarizer 431. The first and second refractive index matching layers 720 and 722 may be configured to minimize reflection that may arise due to a difference in refractive index at the border between their respective adjacent components. The first and second refractive index matching layers 720 and 722 may include a transparent optical clear adhesive (OCA) tape. The OCA tape may be a double-sided adhesive tape formed of an acrylic resin or silicone.

According to an embodiment, a refractive index matching layer may be disposed on a first surface and/or second surface of a component (e.g., the first polarizer 431 or second phase retarder 423) of the electronic device 701, other than the first phase retarder 421.

As is apparent from the foregoing description, according to various embodiments of the disclosure, a light reflection to the image sensor may at least partially be blocked, allowing the valleys and ridges to be clearly distinguished from the fingerprint image detected by the image sensor.

While the disclosure has been illustrated and described with reference to various example embodiments thereof, it will be understood by those skilled in the art that various changes in form and details may be made therein without departing from the spirit and scope of the disclosure as defined by the appended claims and their equivalents.

What is claimed is:

1. A display, comprising:
a transparent cover;
a light source comprising light emitting circuitry configured to emit a first light in a first direction;
a first polarizer disposed between the light source and the cover and configured to linearly polarize the first light; and
a first retarder disposed between the first polarizer and the cover and configured to change a polarization of the first light from a linear polarization to a non-linear polarization,
wherein the first retarder is configured to change a polarization of a second light reflected from a finger outside the display, so that the second light with changed polarization can be blocked by the first polarizer;
wherein the first polarizer is configured to at least partially block the second light reflected from the finger, with the changed polarization, so as to prevent the second light from passing through the light source to an image detector for use in fingerprint detection, and wherein the first polarizer is further configured to transmit a third light reflected from the finger so that the third light can pass through the light source to the image detector and be used in fingerprint detection.

2. The display of claim 1, the second light being a portion of the first light reflected in a second direction opposite the first direction.

3. The display of claim 1, wherein the first retarder is configured to change polarization of the second light from a non-linear polarization to a linear polarization.

4. The display of claim 1, wherein the first polarizer is configured to linearly polarize the third light that is incident thereon from an outside of the display.

5. The display of claim 4, further comprising a second retarder disposed between the light source and the first polarizer and configured to change a polarization of the third light from a linear polarization to a non-linear polarization.

6. The display of claim 5, wherein the third light is a portion of the first light that is incident onto a user's skin and is scattered.

7. The display of claim 1, further comprising at least one anti-reflection layer disposed on at least one surface of the first retarder.

8. The display of claim 1, further comprising at least one refractive index matching layer disposed on at least one surface of the first retarder.

9. An electronic device, comprising:
a transparent cover;
a light source comprising light emitting circuitry configured to emit a first light in a first direction;
a first polarizer disposed between the light source and the cover and configured to linearly polarize the first light;
a first retarder disposed between the first polarizer and the cover and configured to change a polarization of the first light from a linear polarization to a non-linear polarization; and
an image sensor configured to detect a third light transmitted through the light source and forming a fingerprint image;
wherein the first retarder is configured to change a polarization of a second light reflected from a finger in a second direction, so that the second light with changed polarization can be blocked by the first polarizer;
wherein the first polarizer is configured to at least partially block the second light reflected from the finger, with the changed polarization, so as to prevent the second light from reaching the image detector through the light source, and wherein the first polarizer is further configured to transmit a third light reflected from the finger so that the third light can pass through the light source to the image detector and be used to generate the fingerprint image.

10. The electronic device of claim 9, the second light being a portion of the first light reflected in a second direction opposite the first direction.

11. The electronic device of claim 9, wherein the first retarder is configured to change a polarization of the second light from a non-linear polarization to a linear polarization.

12. The electronic device of claim 9, wherein the first polarizer is further configured to linearly polarize the third light that is incident from an outside of the electronic device.

13. The electronic device of claim 12, further comprising a second retarder disposed between the light source and the first polarizer and configured to change a polarization of the third light from a linear polarization to a non-linear polarization.

14. The electronic device of claim 13, wherein the third light is a portion of the first light that is incident onto a user's skin and is scattered.

15. The electronic device of claim 9, further comprising at least one anti-reflection layer disposed on at least one surface of the first retarder.

16. The electronic device of claim 9, further comprising at least one refractive index matching layer disposed on at least one surface of the first retarder.

17. The electronic device of claim 9, further comprising a second polarizer disposed between the light source and the image sensor and configured to linearly polarize a fourth light that is emitted from the light source in a second direction opposite the first direction.

18. The electronic device of claim 17, further comprising a third retarder disposed between the second polarizer and the light source and configured to change a polarization of the third light from a non-linear polarization to a linear polarization.

19. The electronic device of claim 9, further comprising a lens disposed between the light source and the image sensor and configured to control a direction in which at least a portion of the third light propagates.

20. The electronic device of claim 9, further comprising a filter disposed between the light source and the image sensor and configured to transmit a preset frequency band of light.

* * * * *